US010623938B2

(12) United States Patent
Tsirtsis et al.

(10) Patent No.: US 10,623,938 B2
(45) Date of Patent: Apr. 14, 2020

(54) METHODS AND APPARATUS FOR PAGING BASED PEER DISCOVERY

(75) Inventors: Georgios Tsirtsis, London (GB); Junyi Li, Chester, NJ (US); Shailesh Patil, Bridgewater, NJ (US); Saurabh R. Tavildar, Jersey City, NJ (US); Hua Wang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 872 days.

(21) Appl. No.: 13/605,822

(22) Filed: Sep. 6, 2012

(65) Prior Publication Data
US 2014/0064163 A1    Mar. 6, 2014

(51) Int. Cl.
*H04W 48/16* (2009.01)
*H04W 8/00* (2009.01)
*H04W 68/00* (2009.01)

(52) U.S. Cl.
CPC ............ *H04W 8/005* (2013.01); *H04W 68/00* (2013.01)

(58) Field of Classification Search
CPC ....... H04W 8/005; H04W 68/00; H04W 4/20; H04W 68/02; H04W 76/023; H04W 4/005; Y02B 60/50
USPC ........................................................ 370/311
See application file for complete search history.

(56) References Cited

U.S. PATENT DOCUMENTS 6,434,396 B1 *  8/2002  Rune .................... H04W 68/10
                                                    455/502
8,320,398 B2    11/2012  Li et al.
9,198,017 B2    11/2015  Horn et al.
2009/0017843 A1 *  1/2009  Laroia ................. H04W 76/023
                                                    455/458
2010/0008234 A1   1/2010  Ulupinar et al.
2010/0069091 A1   3/2010  El-Saidny
2010/0099439 A1   4/2010  Aghili et al.
2010/0165882 A1   7/2010  Palanki et al.
(Continued)

FOREIGN PATENT DOCUMENTS

CN        101132617 A      2/2008
CN        101507340 A      8/2009
(Continued)

OTHER PUBLICATIONS

Lee et al. U.S. Appl. No. 61/673,739 of WO 2014014323 A1, filed Jul. 22, 2012, whole document (Year: 2012).*
(Continued)

*Primary Examiner* — Un C Cho
*Assistant Examiner* — Jose L Perez
(74) *Attorney, Agent, or Firm* — Arent Fox, LLP and Qualcomm, Incorporated

(57) ABSTRACT

A method, an apparatus, and a computer program product for wireless communication are provided in connection with LTE based paging for peer discovery. In one example, an eNodeB is equipped to receive a message including a D2D discovery notification for a UE, determine that the UE is in an idle mode, and transmit a paging notification to the UE including the D2D discovery notification. In another example, a UE is equipped to receive, from an eNodeB, a paging notification including a D2D discovery notification, determine, while in idle mode, that the D2D discovery notification is successfully decoded, and transmit an ACK to the eNodeB using a RACH sequence on a PRACH.

52 Claims, 13 Drawing Sheets

(56) References Cited

U.S. PATENT DOCUMENTS

| | | |
|---|---|---|
| 2010/0291872 A1 | 11/2010 | Laroia et al. |
| 2011/0045796 A1 | 2/2011 | Lee et al. |
| 2011/0105154 A1 | 5/2011 | Kim |
| 2011/0128911 A1* | 6/2011 | Shaheen .............. H04L 63/104 370/328 |
| 2011/0317569 A1* | 12/2011 | Kneckt ................ H04L 5/0091 370/252 |
| 2012/0076085 A1* | 3/2012 | Chou ................... H04W 68/00 370/329 |
| 2012/0115518 A1 | 5/2012 | Zeira et al. |
| 2012/0155410 A1* | 6/2012 | Toskala ............ H04W 52/0216 370/329 |
| 2012/0178464 A1* | 7/2012 | Li ........................ H04W 72/02 455/450 |
| 2012/0184306 A1 | 7/2012 | Zou et al. |
| 2013/0017856 A1* | 1/2013 | Murias ................ H04W 74/002 455/522 |
| 2013/0064138 A1* | 3/2013 | Hakola .................. H04L 67/16 370/255 |
| 2013/0109301 A1* | 5/2013 | Hakola ................ H04W 76/023 455/39 |
| 2013/0130727 A1* | 5/2013 | Hakola ................ H04W 68/02 455/458 |
| 2013/0157670 A1* | 6/2013 | Koskela ................ H04W 76/14 455/450 |
| 2013/0322413 A1* | 12/2013 | Pelletier ............ H04W 72/1289 370/336 |
| 2014/0010172 A1* | 1/2014 | Wei ...................... H04W 76/14 370/329 |
| 2014/0031028 A1* | 1/2014 | Yamada ................ H04W 8/005 455/419 |
| 2014/0036876 A1* | 2/2014 | Li ........................... H04W 4/70 370/336 |
| 2014/0056220 A1* | 2/2014 | Poitau ................ H04W 40/246 370/328 |
| 2014/0066058 A1* | 3/2014 | Yu .......................... H04L 67/16 455/434 |
| 2015/0063095 A1* | 3/2015 | Deng ................... H04W 76/18 370/221 |
| 2015/0111587 A1* | 4/2015 | Kalhan ................ H04W 76/14 455/450 |
| 2015/0146577 A1* | 5/2015 | Kim ...................... H04W 12/08 370/259 |
| 2015/0327046 A1* | 11/2015 | Lee ..................... H04W 56/002 370/338 |
| 2015/0365976 A1* | 12/2015 | Lee ................... H04W 74/0833 455/422.1 |

FOREIGN PATENT DOCUMENTS

| | | | | |
|---|---|---|---|---|
| CN | 102547984 A | * | 7/2012 | |
| CN | 102547984 A | | 7/2012 | |
| EP | 2031891 A1 | * | 3/2009 | ........... H04W 68/02 |
| EP | 2031891 A1 | | 3/2009 | |
| WO | 2009009379 A1 | | 1/2009 | |
| WO | 2009009394 | | 1/2009 | |
| WO | 2009142629 A2 | | 11/2009 | |
| WO | 2011000419 A1 | | 1/2011 | |
| WO | WO 2013062619 A1 | * | 5/2013 | ........... H04W 4/005 |
| WO | WO-2014014323 A1 | * | 1/2014 | |

OTHER PUBLICATIONS

Lee et al. U.S. Appl. No. 61/673,739 of WO 2014/014323 A1, Jul. 22, 2012, whole document (Year: 2012).*

International Search Report and Written Opinion—PCT/US2013/058550—ISA/EPO—dated Dec. 13, 2013.

* cited by examiner

METHODS AND APPARATUS FOR PAGING BASED PEER DISCOVERY

BACKGROUND

Field

The present disclosure relates generally to communication systems, and more particularly, to a use of a Long Term Evolution (LTE) paging structure for peer discovery in a wireless wide area network (WWAN).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (peer-to-peer) communication.

Currently, many devices may be operable in a cellular network. Further, in many applications, for example, social networking applications, a device may be informed whether a quantity (person, building, etc.) of interest has come in proximity and/or is leaving proximity. Such notifications may generally include small messages in terms of bits (e.g., 100 bits or less). Transporting such small notification can lead to a large overhead in terms of both power and resources used. For example, consider a LTE UE in RRC_IDLE mode. To receive a notification in LTE a UE needs to becomes RRC_CONNECTED which in turn requires several steps. Once the UE is in a RRC_CONNECTED mode, the UE can receive the discovery notification from the eNodeB. After receiving the notification the UE may exchange more messages to return to RRC_IDLE mode. This overhead can become significant in terms of time frequency resources used for peer discovery.

As the demand for device-to-device communication increases, there exists a need for methods/apparatuses for supporting device-to-device communication within LTE while minimizing use of WWAN overhead resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with LTE based paging for peer discovery. In one example, an eNodeB is equipped to receive a message including a D2D discovery notification for a UE, determine that the UE is in an idle mode, and transmit a paging notification to the UE including the D2D discovery notification. In another example, a UE is equipped to receive, from an eNodeB, a paging notification including a D2D discovery notification, determine, while in idle mode, that the D2D discovery notification is successfully decoded, and transmit an ACK to the eNodeB using a RACH sequence on a PRACH.

According to related aspects, a method for LTE based paging for peer discovery is provided. The method can include receiving, by an evolved NodeB (eNodeB), a message including a device to device (D2D) discovery notification for a user equipment (UE). Further, the method can include determining that the UE is in an idle mode. Moreover, the method may include transmitting a paging notification to the UE including the D2D discovery notification.

Another aspect relates to a communications apparatus for LTE based paging for peer discovery. The communications apparatus can include means for receiving, by an eNodeB, a message including a D2D discovery notification for a UE. Further, the communications apparatus can include means for determining that the UE is in an idle mode. Moreover, the communications apparatus can include means for transmitting a paging notification to the UE including the D2D discovery notification.

Another aspect relates to a communications apparatus. The apparatus can include a processing system configured to receive, by an eNodeB, a message including a D2D discovery notification for a UE. Further, the processing system may be configured to determine that the UE is in an idle mode. Moreover, the processing system may further be configured to transmitting a paging notification to the UE including the D2D discovery notification.

Still another aspect relates to a computer program product, which can have a computer-readable medium including code for receiving, by an eNodeB, a message including a D2D discovery notification for a UE. Further, the computer-readable medium can include code for determining that the UE is in an idle mode. Moreover, the computer-readable medium can include code for transmitting a paging notification to the UE including the D2D discovery notification.

According to related aspects, a method for LTE based paging for peer discovery is provided. The method can include receiving, from an eNodeB, a paging notification including a D2D discovery notification. Further, the method can include determining, by a UE in idle mode, whether the D2D discovery notification is successfully decoded. Moreover, the method may include transmitting an acknowledgement (ACK) to the eNodeB upon on a determination that the D2D discovery notification is successfully decoded. In an aspect, the ACK may be transmitted using a reserved random access channel (RACH) sequence on a physical RACH (PRACH).

Another aspect relates to a wireless communications apparatus enabled for LTE based paging for peer discovery. The wireless communications apparatus can include means for receiving, from an eNodeB, a paging notification including a D2D discovery notification. Further, the wireless communications apparatus can include means for determining, by a UE in idle mode, whether the D2D discovery notification is successfully decoded. Moreover, the wireless communications apparatus can include means for transmitting an ACK to the eNodeB upon on a determination that the D2D discovery notification is successfully decoded. In an aspect, the ACK may be transmitted using a RACH sequence on a PRACH.

Another aspect relates to a wireless communications apparatus. The apparatus can include a processing system configured to receive, from an eNodeB, a paging notification including a D2D discovery notification. Further, the processing system may be configured to determine, by a UE in idle mode, whether the D2D discovery notification is successfully decoded. Moreover, the processing system may further be configured to transmit an ACK to the eNodeB upon on a determination that the D2D discovery notification is successfully decoded. In an aspect, the ACK may be transmitted using a RACH sequence on a PRACH.

Still another aspect relates to a computer program product, which can have a computer-readable medium including code for receiving, from an eNodeB, a paging notification including a D2D discovery notification. Further, the computer-readable medium can include code for determining, by a UE in idle mode, whether the D2D discovery notification is successfully decoded. Moreover, the computer-readable medium can include code for transmitting an ACK to the eNodeB upon on a determination that the D2D discovery notification is successfully decoded. In an aspect, the ACK may be transmitted using a RACH sequence on a PRACH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
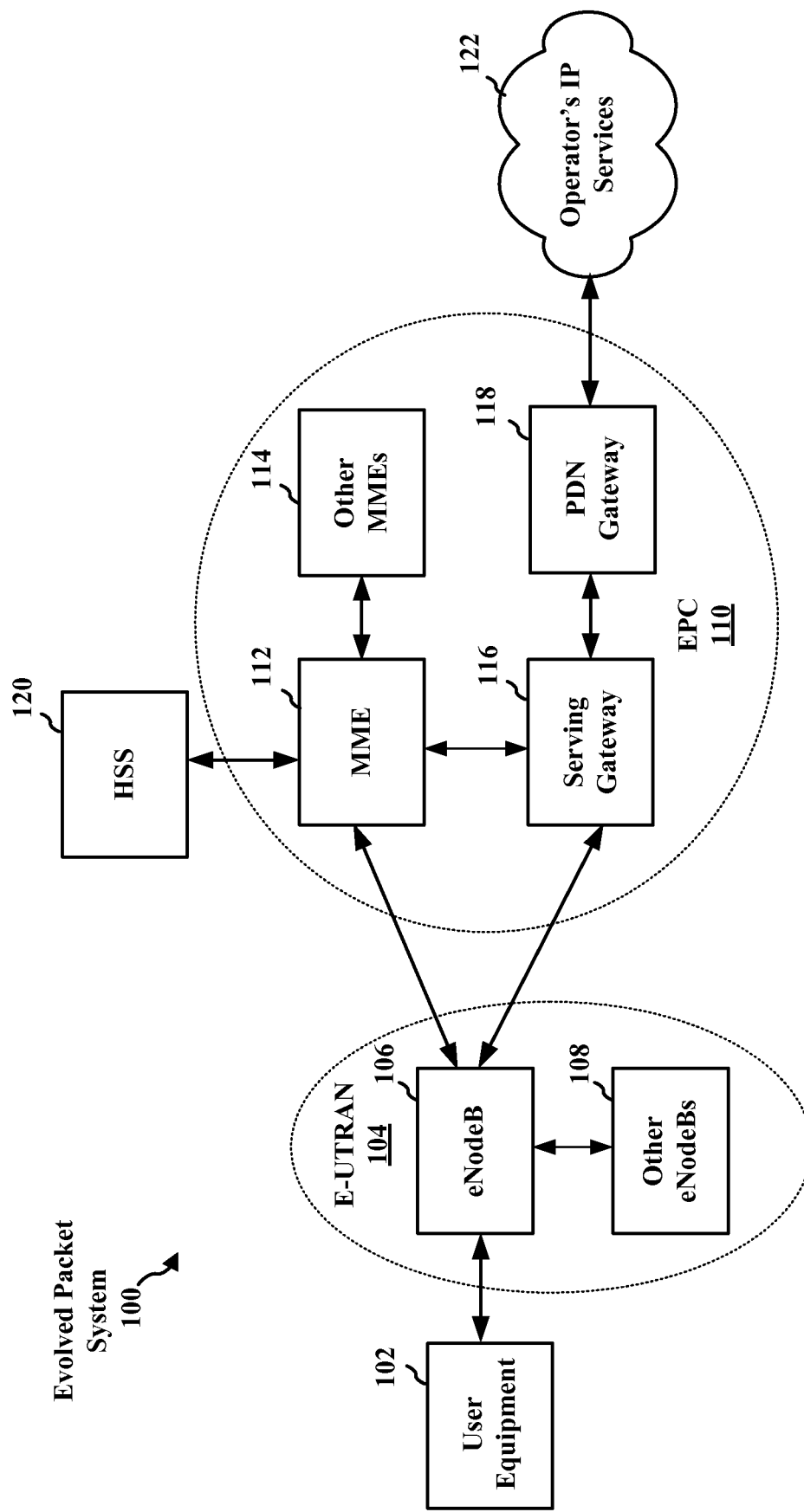
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
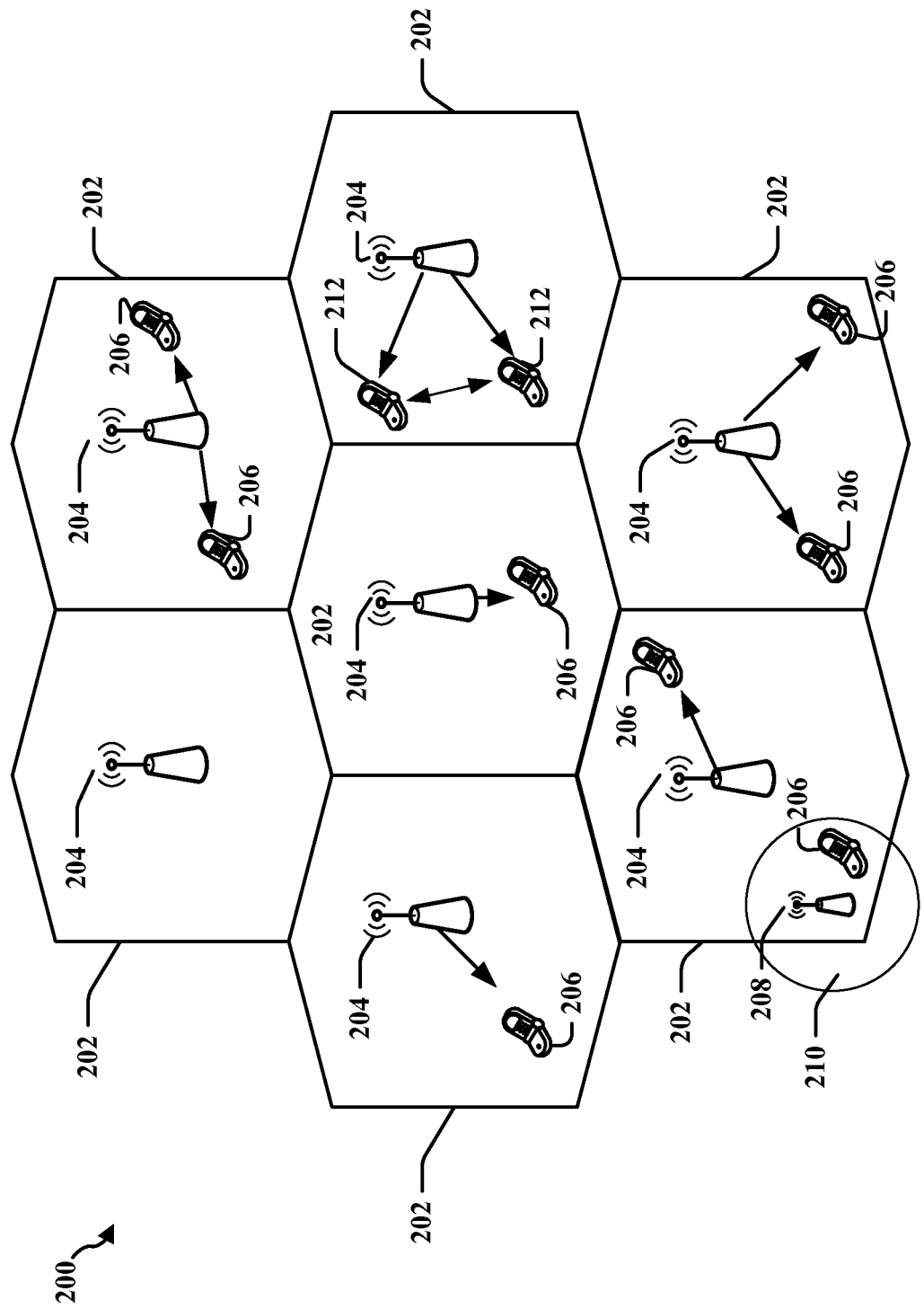
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
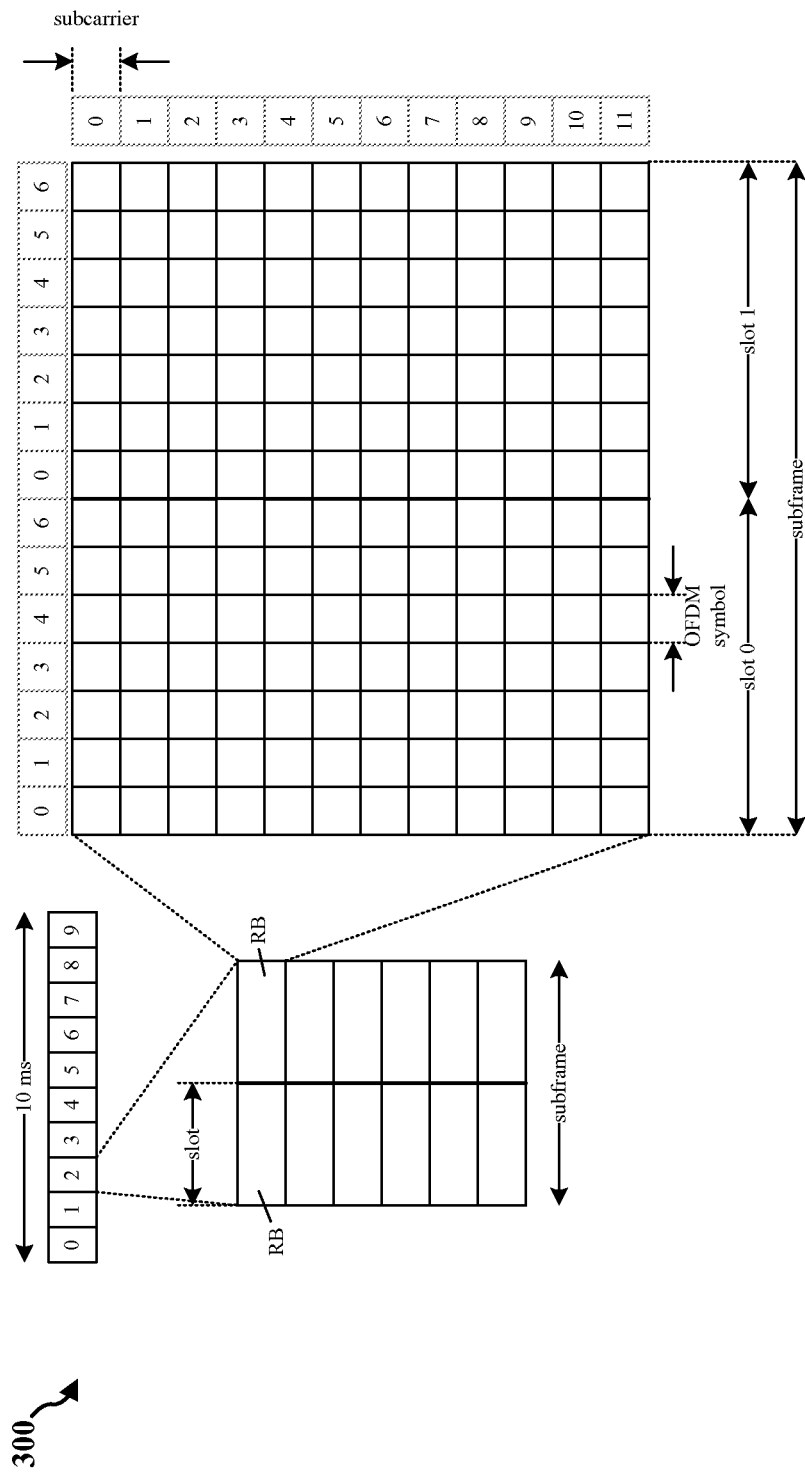
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
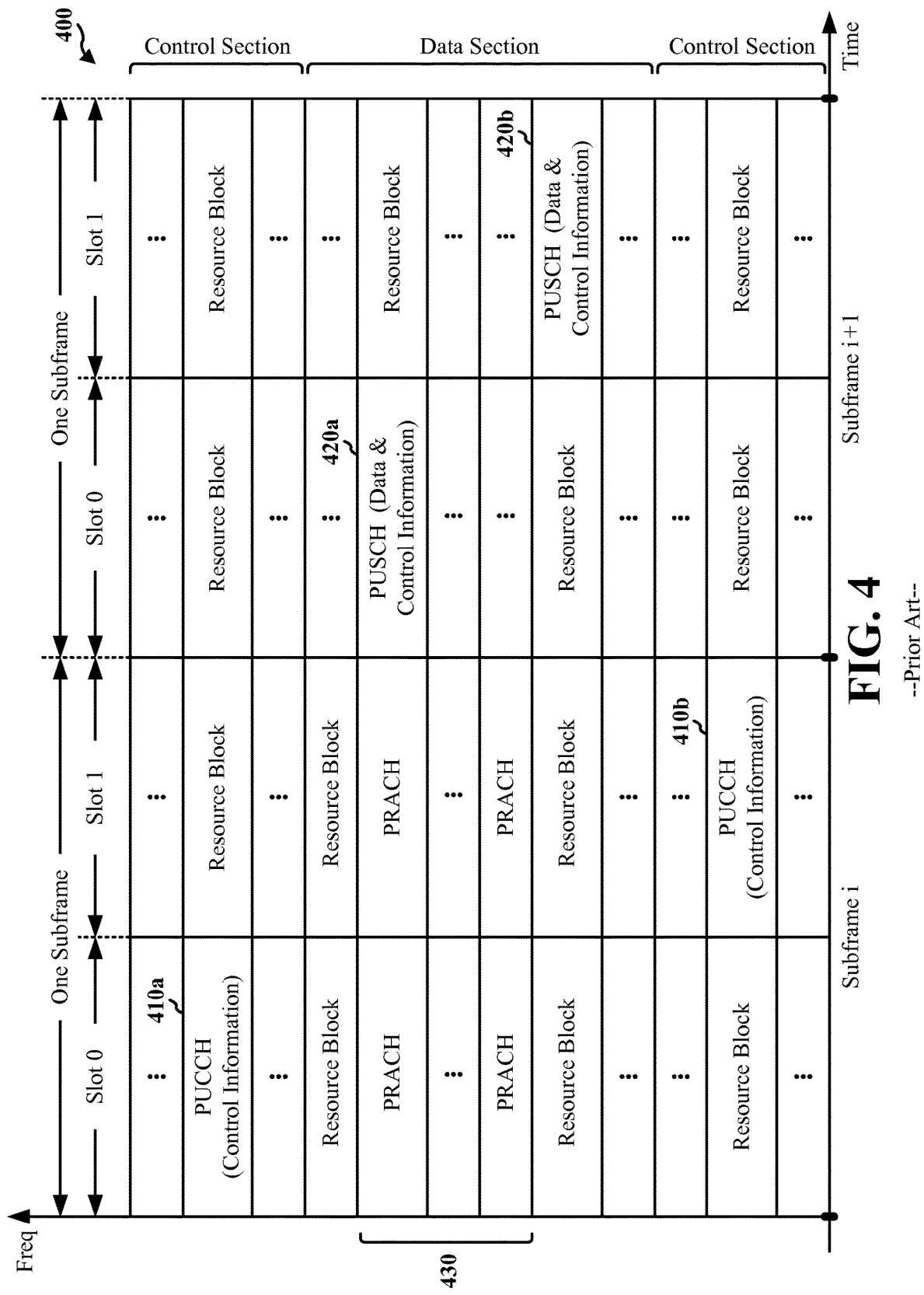
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. In an aspect, a RACH sequence may be reserved for communications of ACK/NACK information from a UE while in idle mode. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
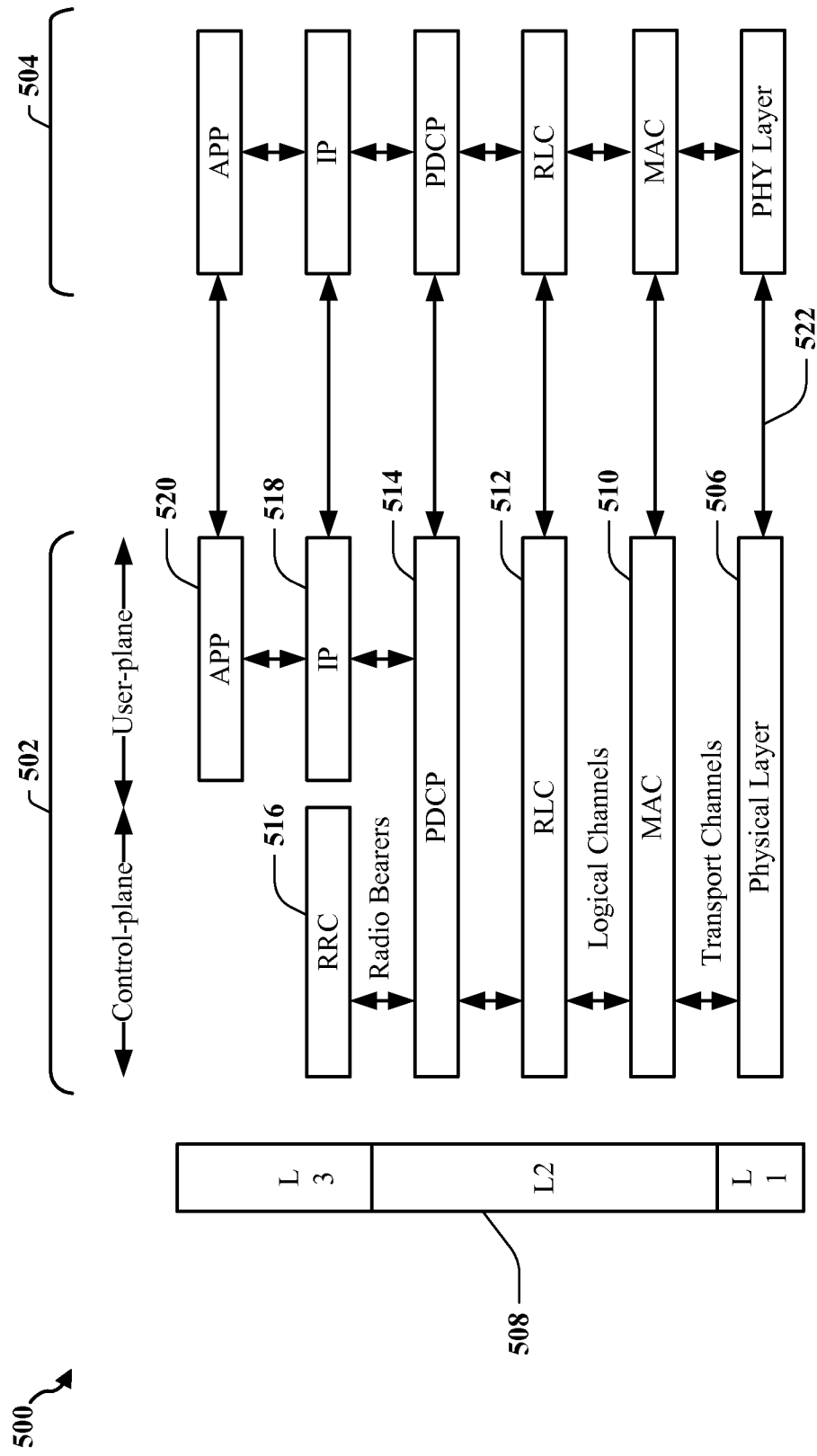
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the 502 UE and the 504 eNB is shown with three layers: Layer 1, Layer 2, and Layer 3. Communication 522 of data/signaling may occur between UE 502 and eNB 502 across the three layers. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB 504 and the UE 502. The user plane also includes an internet protocol (IP) sublayer 518 and an application sublayer 520. The IP sublayer 518 and application sublayer 520 are responsible for supporting communication of application data between the eNB 504 and the UE 502.

In an operational aspect, a UE 502 may switch between RRC idle (RRC_IDLE) and RRC connected (RRC_CONNECTED) modes. Generally, to receive a notification in a LTE based network a UE 502 may switch to a RRC_CONNECTED mode. Switching from RRC_IDLE to RRC_CONNECTED may include steps, such as, paging the UE 502, the UE 502 performs random access using PRACH, the UE 502 receives a random access response from eNB 504, the UE 502 sends a RRC connection request to eNB 504, the UE 502 receives RRC connection response and RRC connection setup complete messages, the UE 502 performs security authentication with the eNB 504, and then the UE 502 performs RRC Connection Reconfiguration. After RRC Connection Reconfiguration, the UE 502 may receive notifications, such as but not limited to, a discovery notification from the eNB 504. After receiving the notification, the UE 502 may exchange additional signaling to return to RRC_IDLE.

Figure 6:
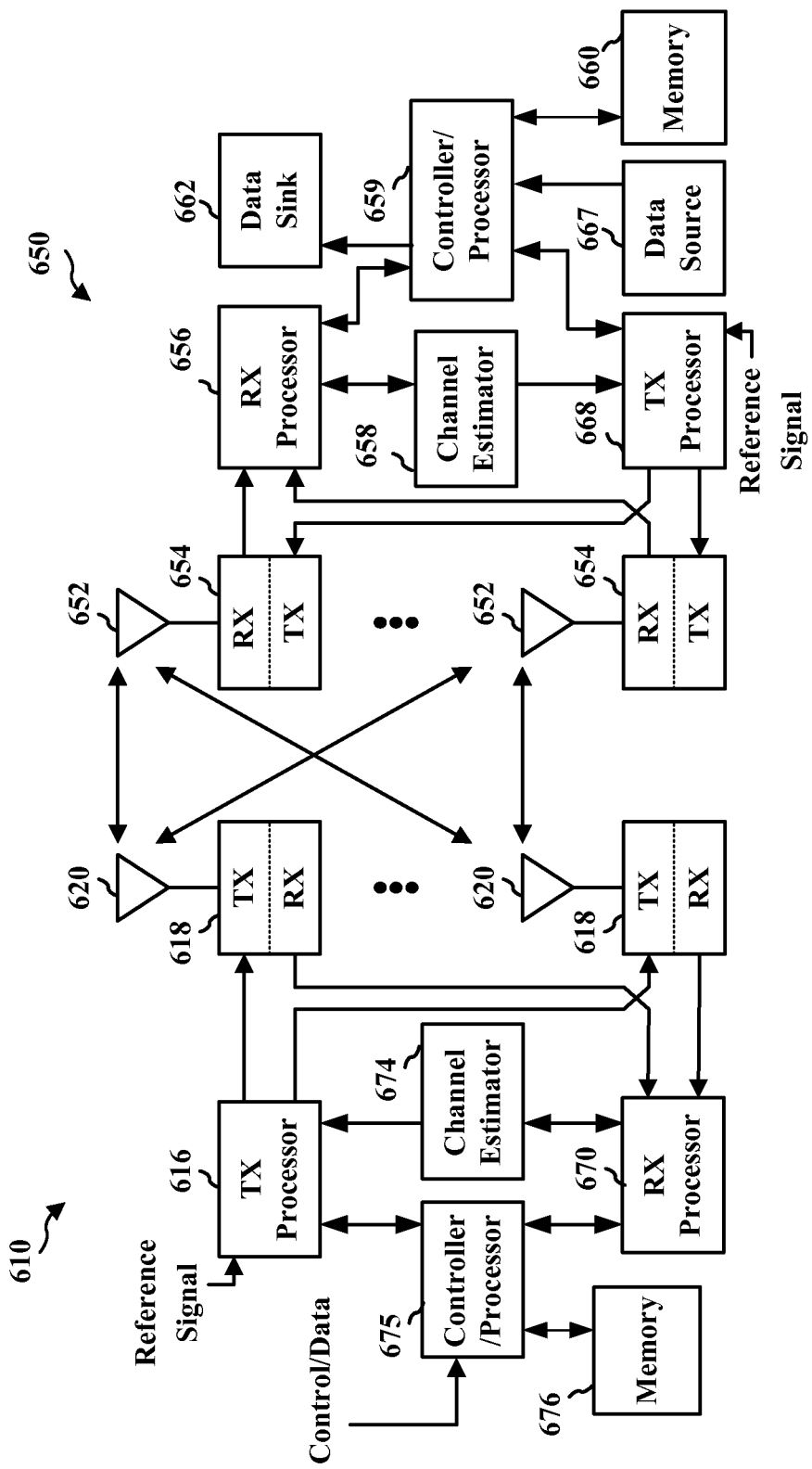
FIG. 6 is a diagram illustrating an example of an evolved Node B and user equipment in an access network.

FIG. 6 is a block diagram of a WAN entity (e.g., eNB, MME, etc.) 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the WAN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
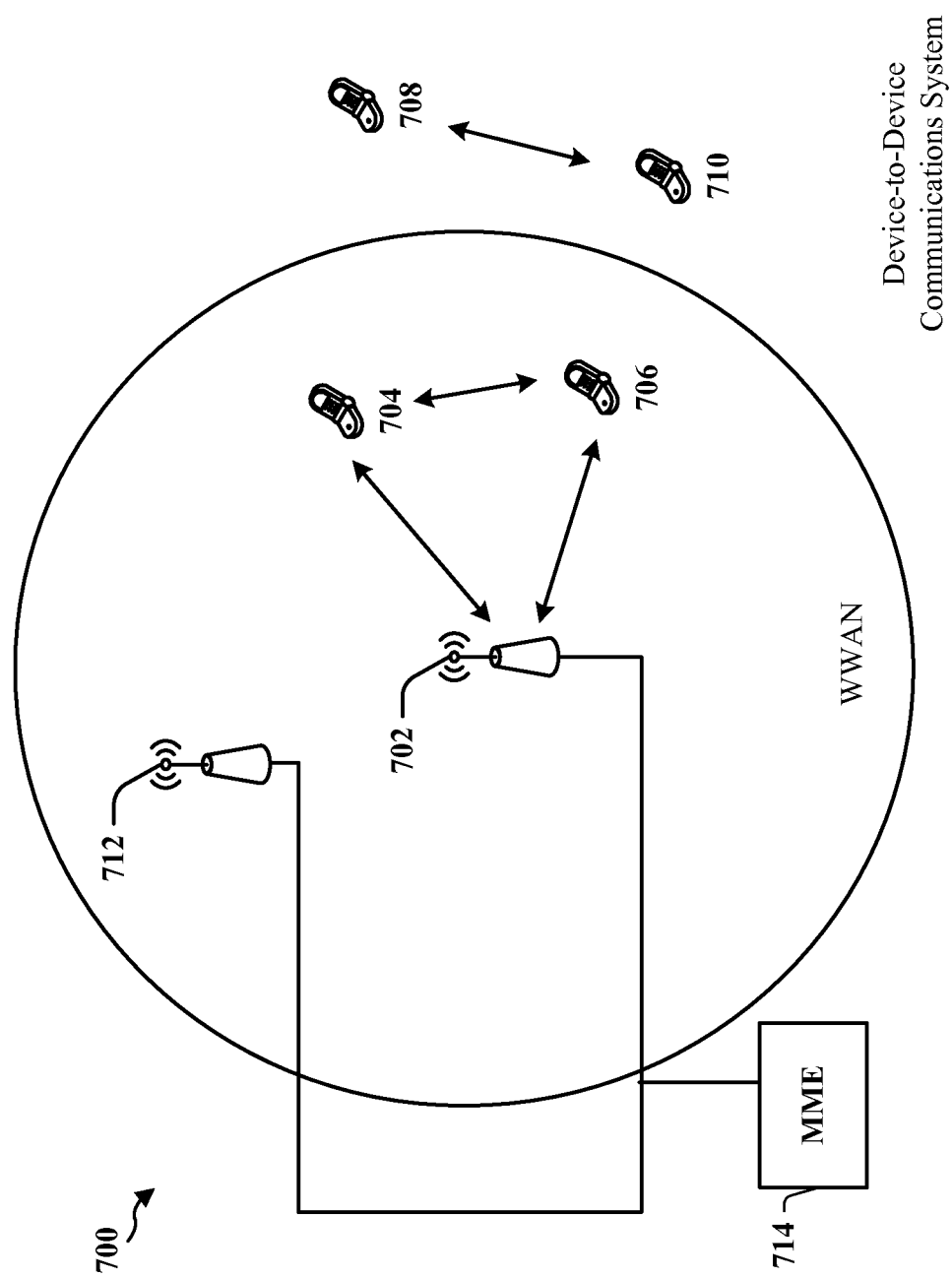
FIG. 7 is a diagram illustrating a device-to-device communications network.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. In another aspect, the WWAN may include multiple base stations (702, 712) that may provide a coordinated communications environment through connectivity provided via one or more network entities (e.g., MME 714).

For example, as shown in FIG. 7, the wireless devices 708, 710 are in device-to-device communication and the wireless devices 704, 706 are in device-to-device communication. The wireless devices 704, 706 are also communicating with the base station 702.

In an operational aspect, eNB 702 may communicate a discovery notification to a UE 704 using a paging channel. In an aspect, the notification generating entity may be a third party server, another UE 706, and/or an entity on the service provider network (e.g., MME 714, eNB 712). The eNodeB 702 may page the UE with page including the discovery notification. By using the paging channel, the UE 704 may read the discovery notification without switching from an RRC idle mode to a RRC connected mode. Further, the UE respond with an ACK/NACK to the received notification using the PRACH channel. In such an aspect, the UE may use reserved RACH sequences on the PRACH. In another aspect, if the eNodeB 702 does not receive RACH notification from the UE 704 within a threshold time duration, the eNodeB 702 may page the UE 704 again. Once the UE has sent out the PRACH message it can go back to low power mode of RRC_IDLE.

By using the paging channel for the D2D notification and the RACH sequence for the UE ACK/NACK, the UE saves power and reduces network overhead usage by avoiding the process of becoming RRC_CONNECTED and then going back to RRC_IDLE.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 8:
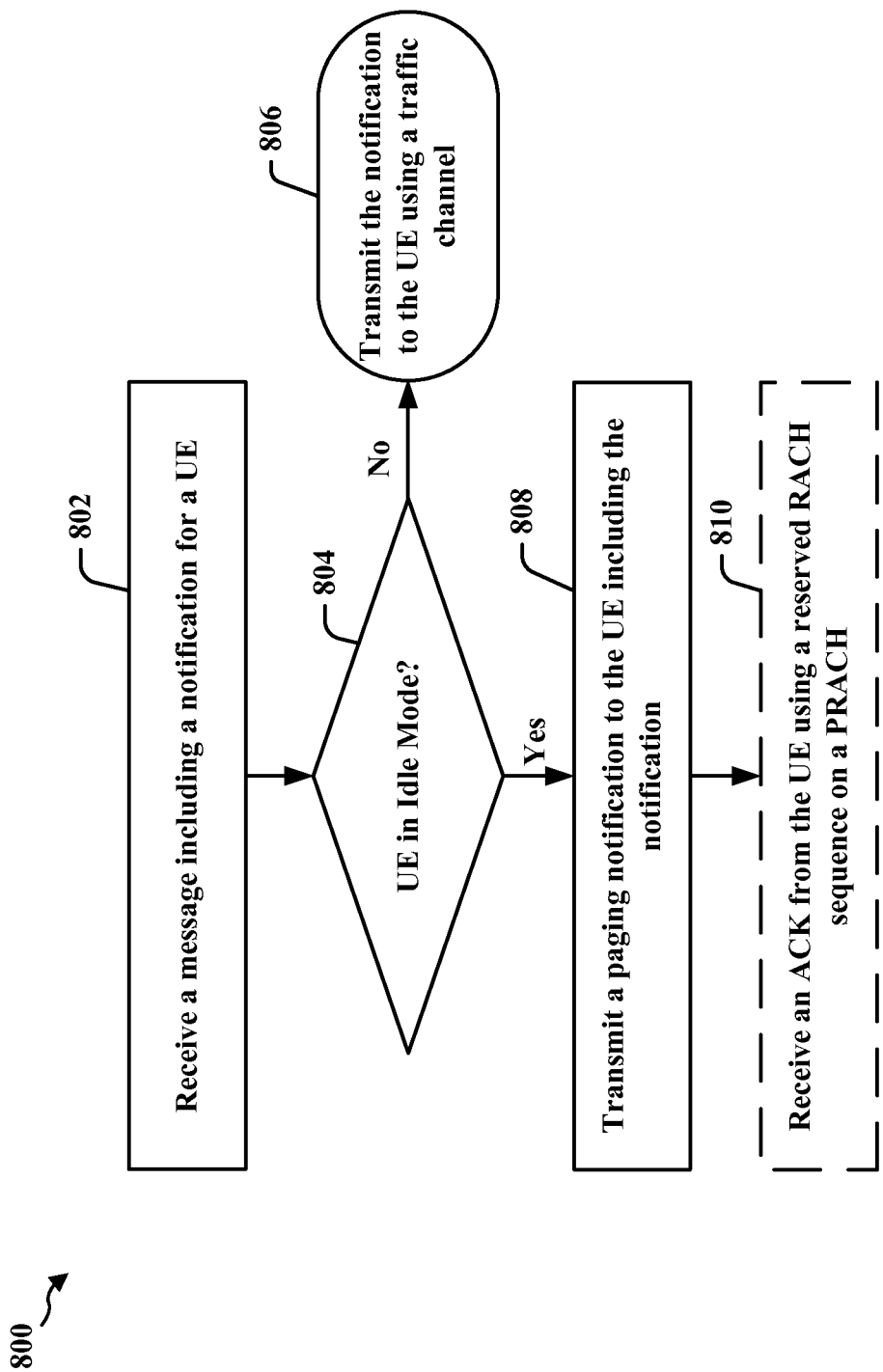
FIG. 8 is a flow chart of a first method of wireless communication.
Figure 11:
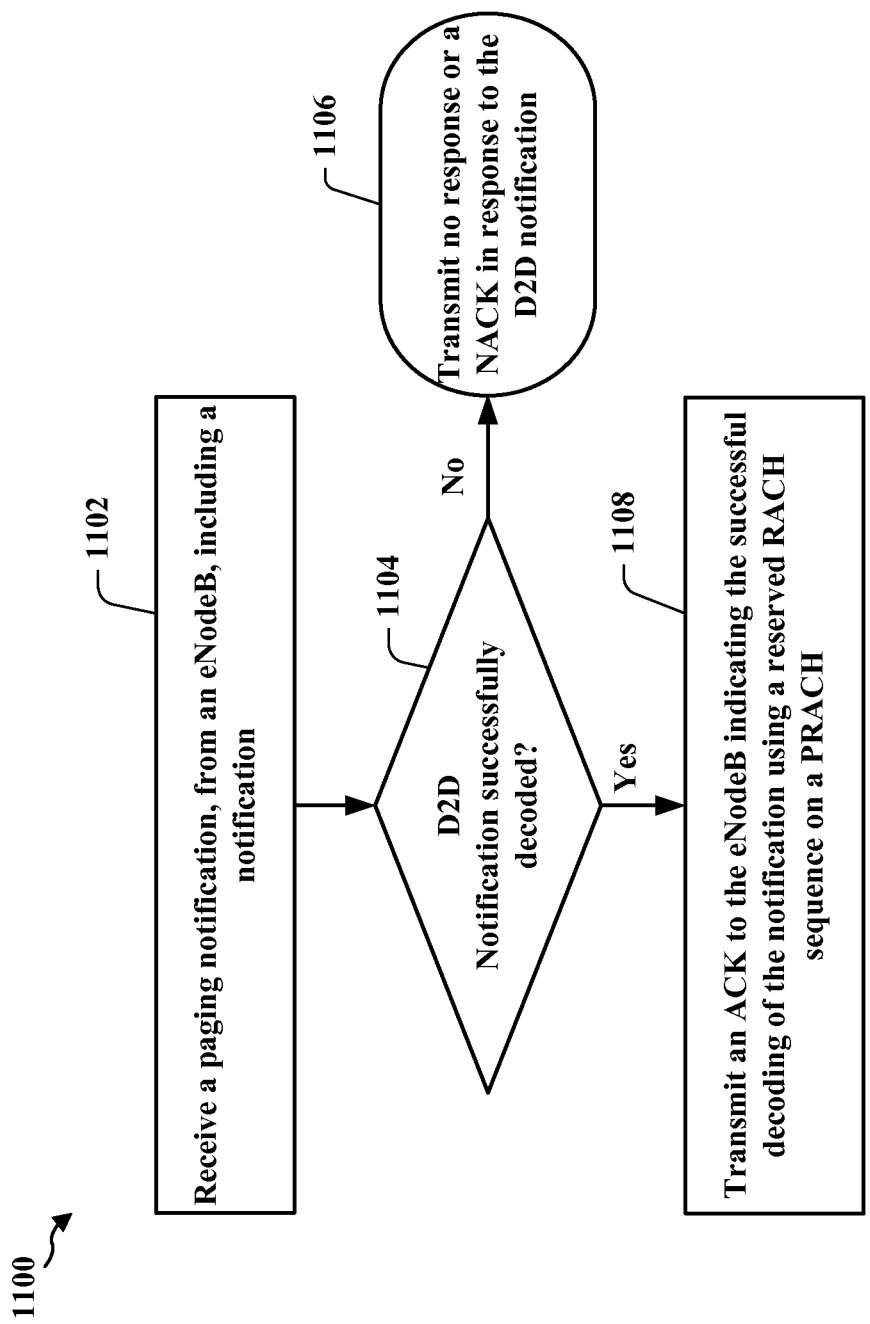
FIG. 11 is a flow chart of a second method of wireless communication.

FIGS. 8 and 11 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 is a flow chart 800 of a first method of wireless communication. The method may be performed by an eNodeB.

At block 802, an eNodeB may receive a message including a notification intended for a UE. In one aspect, the notification may include a discovery notification from a second UE. In another aspect, a notification generating entity (can be a third party server or an entity on the service provider network itself) may inform the eNodeB of the notification.

At block 804, the eNodeB determines whether the UE is operable in a connected mode or idle mode. In an aspect, the connected mode may be a RRC_CONNECTED mode and the idle mode may be a RRC_IDLE mode.

If at block 804, the eNodeB determines that the UE is operable in a connected mode, then at block 806, the notification may be transmitted to the connected UE. In an aspect, the notification may be included on a traffic channel.

By contrast, if at block 804, the eNodeB determines that the UE is operable in an idle mode, then at block 808, the notification may be included in a paging notification transmitted to the UE.

In an optional aspect, the eNodeB may receive an acknowledgement (ACK) of successful decoding of the notification included in the paging notification. In an aspect, the ACK may be received using a reserved RACH sequence on a PRACH. In such an aspect, the eNodeB may have indicated to the UE which RACH sequence(s) have been reserved for communicating the ACK. In another aspect, if the eNodeB does not receive RACH notification from the UE, the eNodeB can page the UE again.

As such, the UE may receive and respond to discovery notifications without having to change its RRC status thereby saving UE the process of becoming RRC_CONNECTED and then going back to RRC_IDLE.

Figure 9:
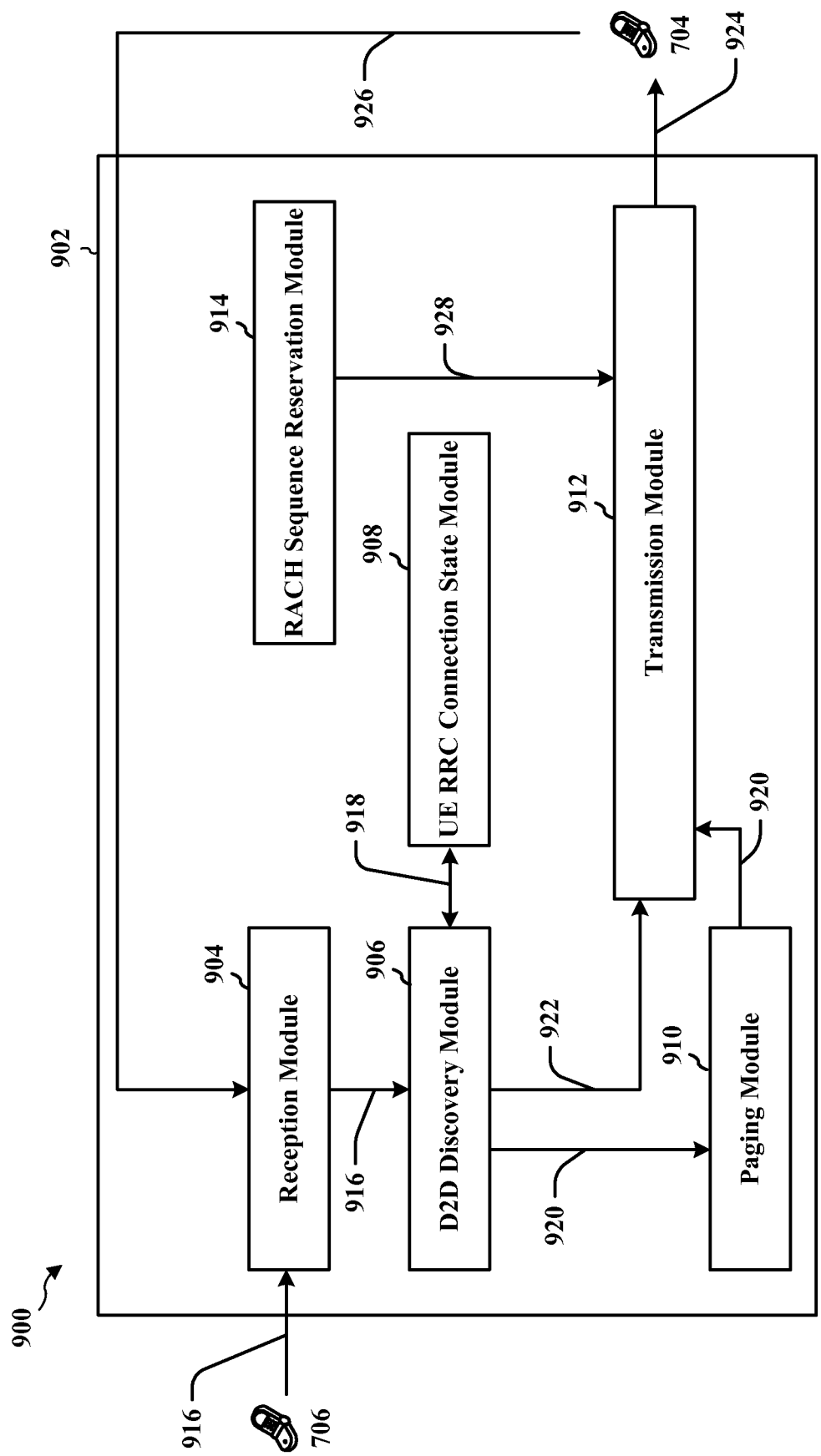
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be an eNodeB.

The apparatus 902 includes a reception module 904 that may receive a D2D discovery notification 916. In an aspect, the D2D notification 916 may be received from another UE 706 with the coverage area of apparatus 902. In another aspect, the D2D notification 916 may be received from a third party server and/or an entity on the service provider network. Apparatus 902 may further include D2D discovery module and UE RRC connection state module 908. In an aspect, UE RRC connection state module 908 may determine the connection state of the UE 704 for which the D2D notification 916 is intended and may provide the RRC connection state information 918 to D2D discovery module 906. In one such aspect, where the RRC connection state information 918 indicates that the UE 704 is in a RRC_CONNECTED mode, then D2D discovery module 906 may provide the D2D notification for transmission 924 to the UE 704 through transmission module 912 using a traffic channel formatted communication 922. In another such aspect, where the RRC connection state information 918 indicates that the UE 704 is in a RRC_IDLE mode, then D2D discovery module 906 may provide the D2D notification 920 to paging module 910. Paging module 910 may include the D2D notification 920 with a paging notification for transmission 924 to the UE 704 through transmission module 912 using a paging channel. In such an aspect, by using a paging channel to convey the D2D discovery notification 916, the target UE 704 may remain in a RRC_IDLE mode and still be informed of the D2D discovery notification 916. In another aspect, apparatus 902 may include RACH sequence reservation module 914 that may reserve a RACH sequence 928 on a PRACH for use by UE 704 to communicate an ACK 926 indicating successful decoding of the D2D discovery notification. In an aspect, the RACH sequence 928 may be transmitted to the UE 704 using transmission module 912.

The apparatus may include additional modules that perform each of the steps of the algorithm in the aforementioned flow charts of FIG. 8. As such, each step in the aforementioned flow charts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
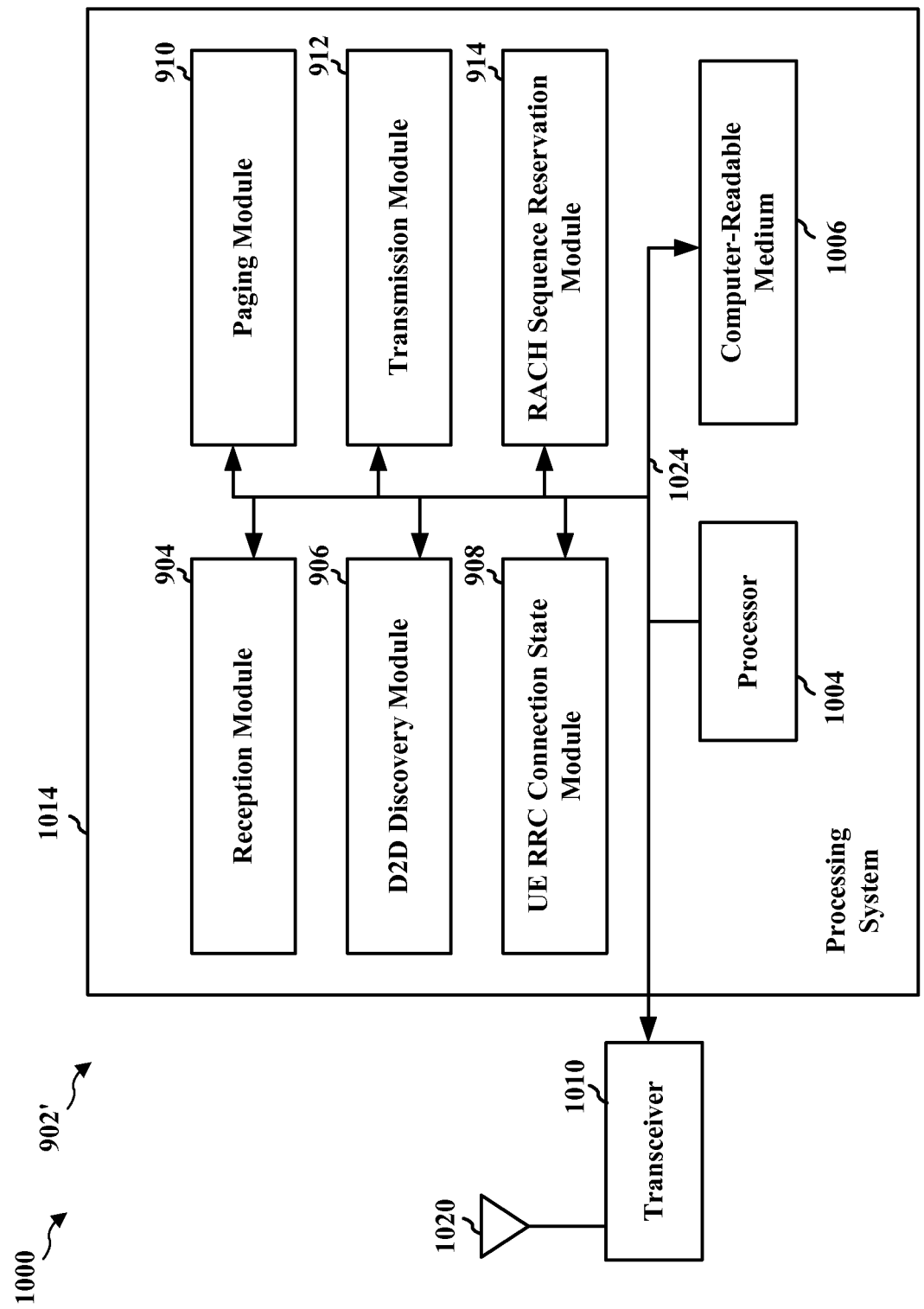
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, 914, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, 910, 912, and 914. The modules may be software modules running in the processor 1004, resident/stored in the computer readable medium 1006, one or more hardware modules coupled to the processor 1004, or some combination thereof. The processing system 1014 may be a component of the eNodeB 610 and may include the memory 676 and/or at least one of the TX processor 616, the RX processor 670, and the controller/processor 675.

In one configuration, the apparatus 902/902' for wireless communication includes means for receiving, by an eNodeB, a message including a D2D discovery notification for a UE, means for determining that the UE is in an idle mode, and means for transmitting a paging notification to the UE including the D2D discovery notification. The apparatus 902/902' may further include means for reserving one or more RACH sequences in the PRACH for communication of an ACK. In another aspect, the apparatus 902/902' means for receiving may further be configured to receive an ACK indicating successful receipt of the D2D discovery notification from the UE using a RACH. In such an aspect, the apparatus 902/902' means for transmitting may be configured to transmit a message to the UE indicating the reserved RACH sequence of the one or more reserved RACH sequences. In another aspect, the apparatus 902/902' means for determining may be further configured to determine that an ACK is not received from the UE within a response time threshold. In such an aspect, the apparatus 902/902' means for transmitting may be configured to transmit a second paging notification including the D2D discovery notification to the UE at a second time. The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 616, the RX Processor 670, and the controller/processor 675. As such, in one configuration, the aforementioned means may be the TX Processor 616, the RX Processor 670, and/or the controller/processor 675 configured to perform the functions recited by the aforementioned means.

FIG. 11 is a flow chart 1100 of a second method of wireless communication. The method may be performed by a UE.

At block 1102, the UE may receive a paging notification from an eNodeB. In an aspect, the paging notification may further include a discovery notification. In one aspect, the discovery notification may include a discovery notification from a second UE. In another aspect, a notification generating entity (e.g., a third party server, an entity associated with the service provider network, etc.) may inform the eNodeB of the discovery notification, and the discovery notification may be included in the paging message. In an aspect, the UE may be operating in a RRC_IDLE mode.

At block 1104, the UE may attempt to decode the discovery notification included with the paging notification.

If at block 1104, the decoding of the discovery notification is not successful, then at block 1106, the UE may disregard the discovery notification and/or transmit a negative acknowledgement (NACK) to the eNodeB.

By contrast, if at block 1104, the decoding of the discovery notification is successful, then at block 1108, the UE may transmit an ACK to the eNodeB. In an aspect, the ACK may be transmitted using a reserved RACH sequence on a PRACH. In such an aspect, the eNodeB may have indicated to the UE which RACH sequence(s) have been reserved for communicating the ACK.

Figure 12:
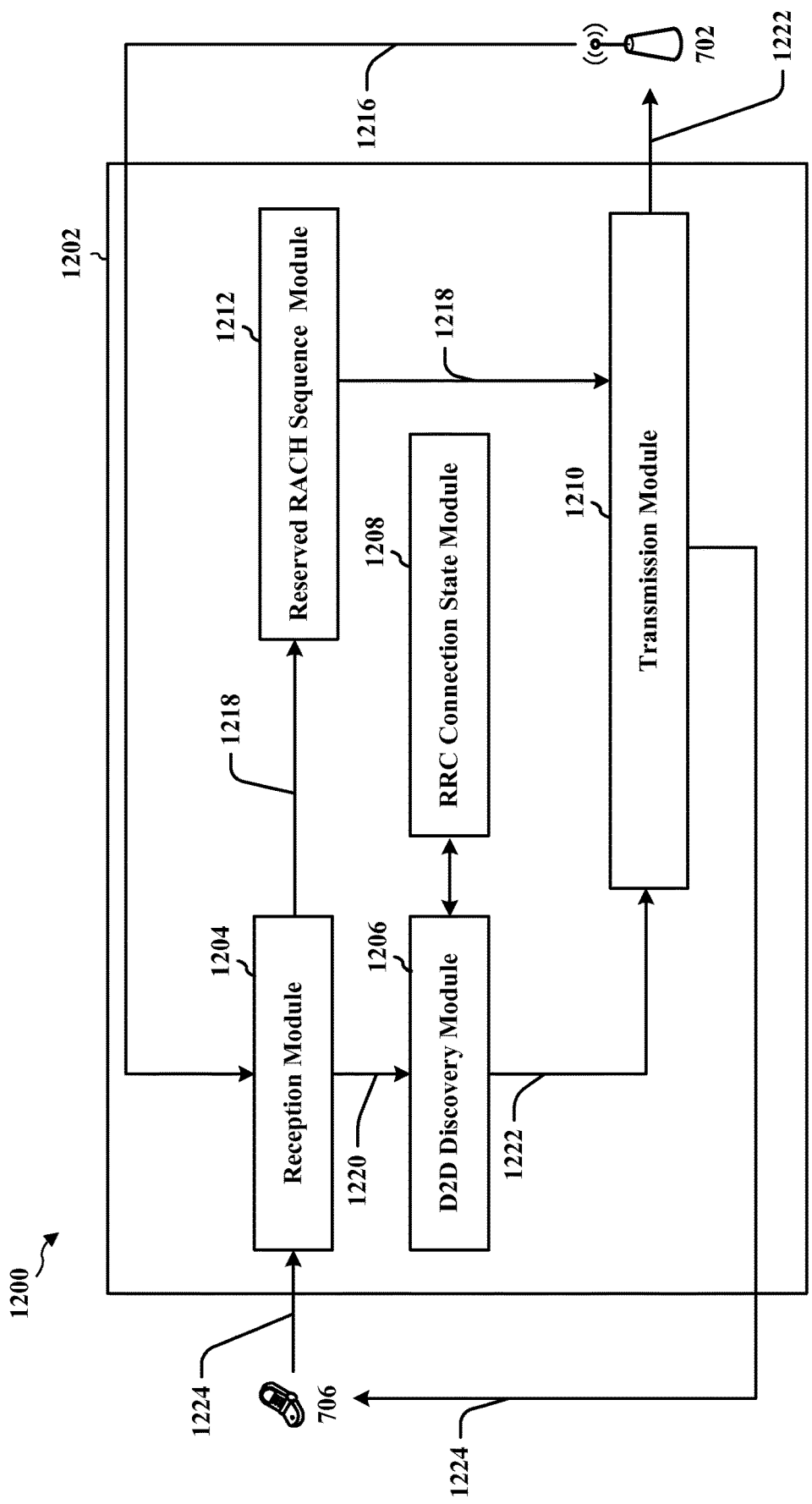
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE.

The apparatus 1202 includes a reception module 1204 that may receives communications 1216 from an eNodeB 702 and/or one or more other UEs (e.g., 706, 708, 710). In an aspect, the communications 1216 may include a paging notification from an eNodeB 702. In such an aspect, where the apparatus 1202 is operating in an idle mode, the notification may include a D2D discovery notification 1220 from another UE (e.g., UE 706). In another aspect, communications 1216 may include a RACH sequence 1218 reserved for the apparatus 1202 to use to provide ACK/NACK responses using a PRACH while in idle mode. In such an aspect, reception module 1204 may provide the reserved RACH sequence 1218 to reserved RACH sequence module 1212. The apparatus 1202 further includes a D2D discovery module 1206 that may process the received D2D discovery notification 1220. Additionally, apparatus 1202 includes RRC connection module 1208 a module 1206 that provides a current RRC connection state (e.g., connected or idle) to the D2D discovery module 1206 to assist D2D discovery module in determining how to respond to the received D2D discovery notification 1220. In an aspect in which RRC connection state module 1208 indicates that the apparatus is in an idle mode, D2D discovery module 1206 may generate an ACK 1222 to be communicated using the reserved RACH sequence 1218. Apparatus 1202 may further include transmission module 1210 that may transmit the ACK 122 to the eNodeB 702 using the reserved RACH sequence 1218. Thereafter, the apparatus 1202 may engage in D2D communications 1224 with the UE 704 indicated in the D2D notification 1220.

The apparatus may include additional modules that perform each of the steps of the algorithm in the aforementioned flow charts of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
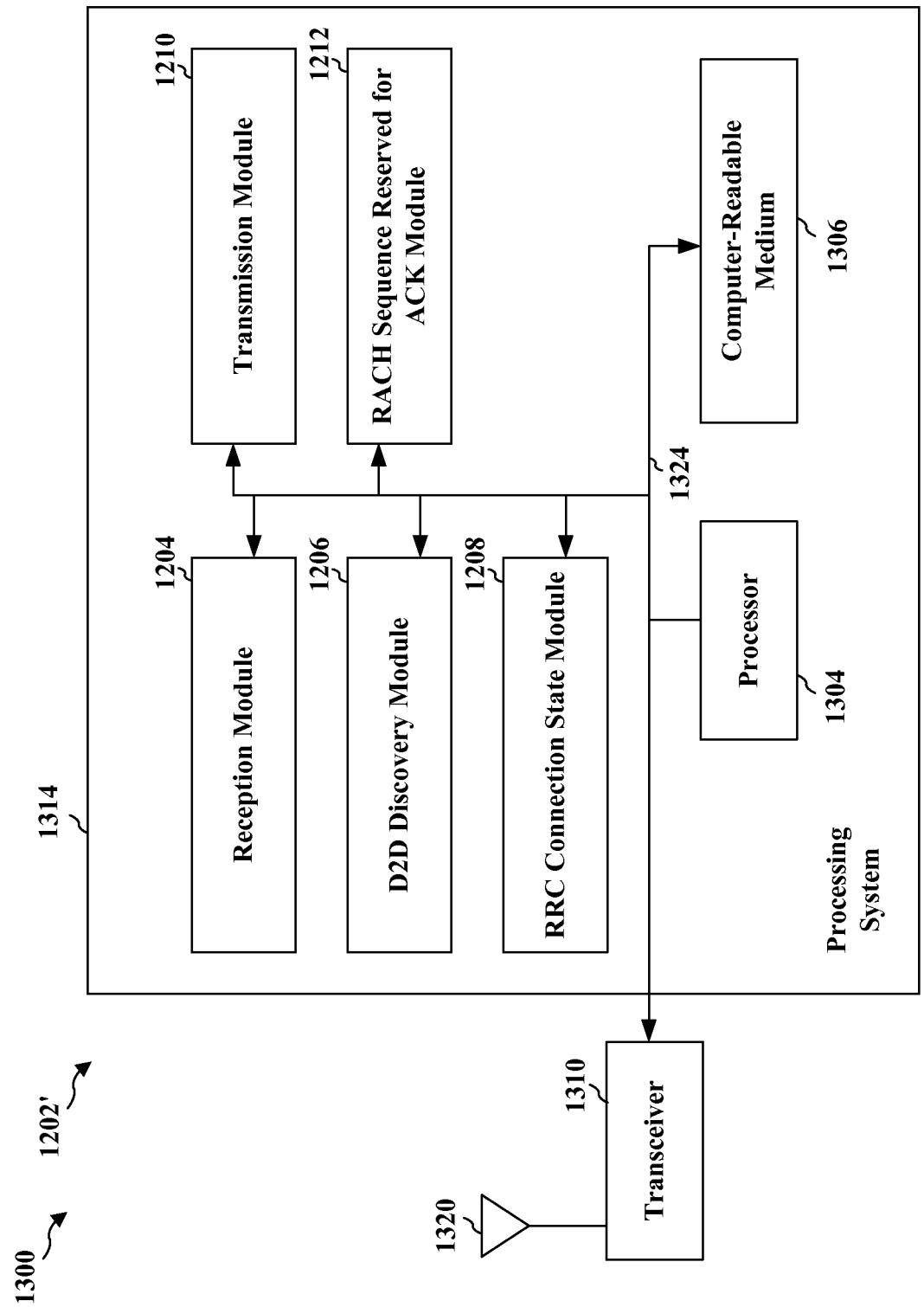
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, and 1212. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for receiving, from an eNodeB, a paging notification including a D2D discovery notification, means for determining, while in idle mode, whether the D2D discovery notification is successfully decoded, and means for transmitting an ACK to the eNodeB upon on a determination that the D2D discovery notification is successfully decoded. In an aspect, the ACK may be transmitted using a reserved RACH sequence on a PRACH. In another aspect, the apparatus 1202/1202' means for transmitting may further include means for transmitting a NACK to the eNodeB upon on a determination that the D2D discovery notification is not successfully decoded. In such an aspect, the NACK may use the reserved RACH sequence on the PRACH. In another aspect, the apparatus 1202/1202' means for receiving may further include means for receiving a message indicating the reserved RACH sequence to use to communicate the ACK. In another aspect, the apparatus 1202/1202' may include means for performing one or more D2D communications with a second UE indicated in the D2D discovery notification. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
receiving, by an evolved NodeB (eNodeB), a message including a device to device (D2D) discovery notification for a user equipment (UE), the D2D discovery notification indicating that a D2D device has come within proximity or is leaving proximity of the UE;
transmitting a paging notification to the UE including the D2D discovery notification as part of peer discovery; and
receiving an acknowledgement (ACK) indicating successful receipt of the D2D discovery notification from the UE using a random access channel (RACH) reserved for communicating the ACK from the UE while in idle mode.

2. The method of claim 1, further comprising:
determining that an ACK is not received from the UE within a response time threshold; and
transmitting a second paging notification including the D2D discovery notification to the UE at a second time based on the determination that the ACK was not received.

3. The method of claim 2, wherein the determination that an ACK is not received from the UE within a response time threshold is based on receiving a negative ACK (NACK) from the UE.

4. The method of claim 1, wherein the RACH is a physical random access channel (PRACH) and the ACK is included in a reserved RACH sequence.

5. The method of claim 4, further comprising:
reserving one or more RACH sequences in the PRACH for communication of the ACK; and
transmitting a message to the UE indicating the reserved RACH sequence of the one or more reserved RACH sequences.

6. The method of claim 1, wherein the D2D discovery notification is generated by a second UE.

7. The method of claim 1, wherein the D2D discovery notification is received from at least one of a third party server, or a second UE.

8. The method of claim 1, further comprising determining that the UE is in an idle mode, wherein the idle mode is a radio resource control idle mode (RRC_IDLE).

9. A method of wireless communications, comprising:
receiving, from an eNodeB, a paging notification including a device to device (D2D) discovery notification as part of peer discovery, the D2D discovery notification indicating that a D2D device has come within proximity or is leaving proximity of a user equipment (UE);
determining, by the UE in idle mode, whether the D2D discovery notification is successfully decoded; and
transmitting an acknowledgement (ACK) to the eNodeB upon a determination that the D2D discovery notification is successfully decoded, wherein the ACK is transmitted using a reserved random access channel (RACH) sequence on a physical RACH (PRACH).

10. The method of claim 9, further comprising transmitting a negative acknowledgement (NACK) to the eNodeB upon a determination that the D2D discovery notification is not successfully decoded, wherein the NACK is transmitted using the reserved RACH sequence on the PRACH.

11. The method of claim 9, further comprising:
receiving a message indicating the reserved RACH sequence to use to communicate the ACK.

12. The method of claim 9, further comprising:
performing one or more D2D communications with a second UE indicated in the D2D discovery notification.

13. The method of claim 9, wherein the idle mode is a radio resource control idle mode (RRC_IDLE).

14. An apparatus for wireless communication, the apparatus comprising an evolved NodeB (eNodeB), the eNodeB including:
means for receiving a message including a device to device (D2D) discovery notification for a user equipment (UE), the D2D discovery notification indicating that a D2D device has come within proximity or is leaving proximity of the UE;
means for transmitting a paging notification to the UE including the D2D discovery notification as part of peer discovery; and
means for receiving an acknowledgement (ACK) indicating successful receipt of the D2D discovery notification from the UE using a random access channel (RACH) reserved for communicating the ACK from the UE while in idle mode.

15. The apparatus of claim 14, wherein the means for determining is further configured to determine that an ACK is not received from the UE within a response time threshold; and
wherein the means for transmitting is further configured to transmit a second paging notification including the D2D discovery notification to the UE at a second time based on the determination that the ACK was not received.

16. The apparatus of claim 15, wherein the determination that an ACK is not received from the UE within a response time threshold is based on receiving a negative ACK (NACK) from the UE.

17. The apparatus of claim 14, wherein the RACH is a physical random access channel (PRACH) and the ACK is included in a reserved RACH sequence.

18. The apparatus of claim 17, further comprising:
means for reserving one or more RACH sequences in the PRACH for communication of an ACK; and
wherein the means for transmitting is further configured to transmit a message to the UE indicating the reserved RACH sequence of the one or more reserved RACH sequences.

19. The apparatus of claim 14, wherein the D2D discovery notification is generated by a second UE.

20. The apparatus of claim 14, wherein the D2D discovery notification is received from at least one of: a third party server, or a second UE.

21. The apparatus of claim 14, further comprising means for determining that the UE is in an idle mode, wherein the idle mode is a radio resource control idle mode (RRC_IDLE).

22. An apparatus for wireless communications, comprising:
means for receiving, from an eNodeB, a paging notification including a device to device (D2D) discovery notification as part of peer discovery, the D2D discovery notification indicating that a D2D device has come within proximity or is leaving proximity of the apparatus;
means for determining, by the apparatus in idle mode, whether the D2D discovery notification is successfully decoded; and
means for transmitting an acknowledgement (ACK) to the eNodeB upon a determination that the D2D discovery notification is successfully decoded, wherein the ACK is transmitted using a reserved random access channel (RACH) sequence on a physical RACH (PRACH).

23. The apparatus of claim 22, wherein the means for transmitting is further configured to transmit a negative acknowledgement (NACK) to the eNodeB upon a determination that the D2D discovery notification is not successfully decoded, wherein the NACK is transmitted using the reserved RACH sequence on the PRACH.

24. The apparatus of claim 22, wherein the means for receiving is further configured to receive a message indicating the reserved RACH sequence to use to communicate the ACK.

25. The apparatus of claim 22, further comprising:
means for performing one or more D2D communications with a second UE indicated in the D2D discovery notification.

26. The apparatus of claim 22, wherein the idle mode is a radio resource control idle mode (RRC_IDLE).

27. An apparatus for wireless communication, the apparatus comprising an evolved NodeB (eNodeB), the eNodeB including:
a memory; and
at least one processor coupled to the memory, and configured to:
receive a message including a device to device (D2D) discovery notification for a user equipment (UE), the D2D discovery notification indicating that a D2D device has come within proximity or is leaving proximity of the UE;
transmit a paging notification to the UE including the D2D discovery notification as part of peer discovery, and
receive an acknowledgement (ACK) indicating successful receipt of the D2D discovery notification from the UE using a random access channel (RACH) reserved for communicating the ACK from the UE while in idle mode.

28. The apparatus of claim 27, wherein the at least one processor processing system is further configured to:

determine that an ACK is not received from the UE within a response time threshold; and transmit a second paging notification including the D2D discovery notification to the UE at a second time based on the determination that the ACK was not received.

29. The apparatus of claim 28, wherein the determination that an ACK is not received from the UE within a response time threshold is based on receiving a negative ACK (NACK) from the UE.

30. The apparatus of claim 27, wherein the RACH is a physical random access channel (PRACH) and the ACK is included in a reserved RACH sequence.

31. The apparatus of claim 30, wherein the at least one processor processing system is further configured to:

reserve one or more RACH sequences in the PRACH for communication of an ACK; and transmit a message to the UE indicating the reserved RACH sequence of the one or more reserved RACH sequences.

32. The apparatus of claim 27, wherein the D2D discovery notification is generated by a second UE.

33. The apparatus of claim 27, wherein the D2D discovery notification is received from at least one of: a third party server, or a second UE.

34. The apparatus of claim 27, wherein the at least one processor processing system is further configured to: determine that the UE is in an idle mode, wherein the idle mode is a radio resource control idle mode (RRC_IDLE).

35. An apparatus for wireless communication, comprising:

a memory; and at least one processor coupled to the memory, and configured to:

receive, from an eNodeB, a paging notification including a device to device (D2D) discovery notification as part of peer discovery, the D2D discovery notification indicating that a D2D device has come within proximity or is leaving proximity of the apparatus;

determine, by the apparatus in idle mode, whether the D2D discovery notification is successfully decoded; and transmit an acknowledgement (ACK) to the eNodeB upon a determination that the D2D discovery notification is successfully decoded, wherein the ACK is transmitted using a reserved random access channel (RACH) sequence on a physical RACH (PRACH).

36. The apparatus of claim 35, wherein the at least one processor is further configured to transmit a negative acknowledgement (NACK) to the eNodeB upon a determination that the D2D discovery notification is not successfully decoded, wherein the NACK is transmitted using the reserved RACH sequence on the PRACH.

37. The apparatus of claim 35, wherein the at least one processor is further configured to:

receive a message indicating the reserved RACH sequence to use to communicate the ACK.

38. The apparatus of claim 35, wherein the at least one processor is further configured to:

perform one or more D2D communications with a second UE indicated in the D2D discovery notification.

39. The apparatus of claim 35, wherein the idle mode is a radio resource control idle mode (RRC_IDLE).

40. A non-transitory computer-readable medium storing computer executable code, comprising code to:

receive, by an evolved NodeB (eNodeB), a message including a device to device (D2D) discovery notification for a user equipment (UE), the D2D discovery notification indicating that a D2D device has come within proximity or is leaving proximity of the UE;

transmit a paging notification to the UE including the D2D discovery notification as part of peer discovery; and receive an acknowledgement (ACK) indicating successful receipt of the D2D discovery notification from the UE using a random access channel (RACH) reserved for communicating the ACK from the UE while in idle mode.

41. The non-transitory computer medium of claim 40 further comprising code to:

determine that an ACK is not received from the UE within a response time threshold; and transmit a second paging notification including the D2D discovery notification to the UE at a second time based on the determination that the ACK was not received.

42. The non-transitory computer medium of claim 41, wherein the determination that an ACK is not received from the UE within a response time threshold is based on receiving a negative ACK (NACK) from the UE.

43. The non-transitory computer medium of claim 40, wherein the RACH is a physical random access channel (PRACH) and the ACK is included in a reserved RACH sequence.

44. The non-transitory computer medium of claim 43, further comprising code to:

reserve one or more RACH sequences in the PRACH for communication of an ACK; and transmit a message to the UE indicating the reserved RACH sequence of the one or more reserved RACH sequences.

45. The non-transitory computer medium of claim 40, wherein the D2D discovery notification is generated by a second UE.

46. The non-transitory computer medium of claim 40, wherein the D2D discovery notification is received from at least one of: a third party server, or a second UE.

47. The non-transitory computer medium of claim 40, wherein the code is code to determine that the UE is in an idle mode, the idle mode comprising a radio resource control idle mode (RRC_IDLE).

48. A non-transitory computer-readable medium storing computer executable code, comprising code to:

receive, from an eNodeB, a paging notification including a device to device (D2D) discovery notification as part of peer discovery, the D2D discovery notification indicating that a D2D device has come within proximity or is leaving proximity of a user equipment (UE);

determine, by the UE in idle mode, whether the D2D discovery notification is successfully decoded; and transmit an acknowledgement (ACK) to the eNodeB upon a determination that the D2D discovery notification is successfully decoded, wherein the ACK is transmitted using a reserved random access channel (RACH) sequence on a physical RACH (PRACH).

49. The non-transitory computer medium of claim 48, further comprising code to transmit a negative acknowledgement (NACK) to the eNodeB upon a determination that the D2D discovery notification is not successfully decoded, wherein the NACK is transmitted using the reserved RACH sequence on the PRACH.

50. The non-transitory computer medium of claim 48, further comprises code to:

receive a message indicating the reserved RACH sequence to use to communicate the ACK.

51. The non-transitory computer medium of claim 48, further comprising code to:
    receive one or more D2D communications with a second UE indicated in the D2D discovery notification.

52. The non-transitory computer medium of claim 48, wherein the idle mode is a radio resource control idle mode (RRC_IDLE).

* * * * *